United States Patent [19]
Banzi et al.

[11] Patent Number: 4,929,682
[45] Date of Patent: May 29, 1990

[54] PROCESS FOR CRAFTING MALEIC ANHYDRIDE ON OLEFINIC POLYMERS

[75] Inventors: Viviano Banzi; Roberto Fabbri, both of Ferrara, Italy

[73] Assignee: Ausimont S.p.A., Milan, Italy

[21] Appl. No.: 191,809

[22] Filed: May 6, 1988

Related U.S. Application Data

[63] Continuation of Ser. No. 816,407, Jan. 6, 1986, abandoned.

[30] Foreign Application Priority Data

Jan. 8, 1985 [IT] Italy ................................ 19048 A/85

[51] Int. Cl.$^5$ .................. C08F 255/04; C08F 255/06; C08F 291/02
[52] U.S. Cl. ................................... 525/257; 525/263; 525/285; 525/315
[58] Field of Search ........................ 525/263, 283, 257

[56] References Cited

U.S. PATENT DOCUMENTS 3,953,541  4/1976  Fuji ...................................... 525/285
4,456,732  6/1984  Nambu ............................... 525/285

*Primary Examiner*—Jacob Ziegler
*Attorney, Agent, or Firm*—Stevens, Davis, Miller & Mosher

[57] ABSTRACT

Grafting of maleic anhydride, possibly together with styrene, on olefinic polymers, carried out in the presence of radical starters, characterized in that one operates with the polymer maintained in suspension of either an aliphatic, cycloaliphatic or aromatic ketone, containing from 3 to 22 carbon atoms.

7 Claims, No Drawings

PROCESS FOR CRAFTING MALEIC ANHYDRIDE ON OLEFINIC POLYMERS2

This application is a Continuation of application Ser. No. 816,407, filed Jan. 6, 1986, now abandoned.

BACKGROUND OF THE INVENTION

Processes for the grafting of maleic anhydride on olefinic polymers, also of the elastomeric type, have been widely described in the literature, for instance in U.S. Pat. No. 4,010,223 and in the "Journal for Polymer Chem. Ed., vol. 22, 1984—page 1335.

The grafting techniques, used for the purpose, differ from one another by the physical state in which the polymer to be grafted is used, wherefore one may have processes of the so-called bulk type, or in solution or in suspension.

In the first kind of process, the polymer and the unsaturated polymer are mixed together in the presence of free radical-generating compounds, at a temperature (in general comprised between 150° C. and 180° C.), which render the material workable in extruders, mixers, etc. However simple, this method is substantially little advantageous due to the difficulty of controlling and reproducing the operational conditions, especially when the olefinic polymer is rubbery.

The method in solution operates with the polymer, the monomer and the radicalic starter, all dissolved in a solvent, generally an aromatic hydrocarbon, at temperatures around 100° C. This method offers various different advantages, more particularly that of an effective thermal control; however, the method has the drawback of requiring low concentrations of polymer and thus, to have to separate and to recycle great quantities of solvent.

The grafting in suspension is achieved by suspending in a dispersing means, in general water, the granulated polymer, possibly blown with solvents, the monomer, the starter and the surfactant, and by then letting the reaction mixture react at temperatures comprised between 60° C. and 100° C.

The suspension method offers the advantages of an effective thermal control of the reaction, the possibility of operating at high concentrations of polymer, and of separating the grafted polymer by means of a simple filtering or centrifuging.

Such a method, however, is not suited for the grafting of monomers that are easily hydrolizeable in water, such as for instance maleic anhydride. In this case, in fact, the monomer that would be grafted would be maleic acid instead of maleic anhydride, and this would require further treatment at a high temperature of the grafted polymer, to eliminate the water and reform the anhydride.

THE PRESENT INVENTION

The Applicant has now found that it is possible to carry out the grafting of maleic anhydride on olefinic polymers by the suspension method, thereby avoiding the previously above mentioned drawbacks, if as a suspension means there is used one or more ketones of the aliphatic, cycloaliphatic or aromatic type containing from 3 to 22 carbon atoms in the chain, or in the main group containing the ketonic group.

Amongst the aliphatic ketones, there are preferably used those comprised by the general formula:

wherein: R and R' are linear, branched or cyclic alkyl groups, possibly containing substituent groups containing from 1 to 20 carbon atoms. Examples of usable ketones belonging to this formula (I), are: acetone, methylethylketone, diethylketone, di-n-propylketone, di-n-butylketone, di-iso-butylketone, methyl-isobutylketone, di-n-amylketone, di-n-hexylketone, methyl-n-amylketone, methyl-cyclohexyl-ketone.

Amongst the cycloaliphatic ketones there are preferably used those comprised by the general formulae:

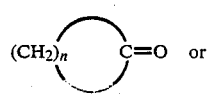

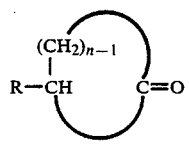

wherein: n is an integer comprised between 2 and 21, R is a linear, branched or cyclic alkyl group containing from 1 to 16 carbon atoms, Examples of ketones of formulae (II) and (III) are: cyclopentanone, cyclobutanone, cyclohexanone, 2-methyl, cyclohexanone, cycloheptanone, cyclopentadecanone.

Usable aromatic ketones employable for the purpose are preferably those of the general formulae:

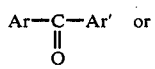

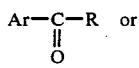

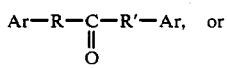

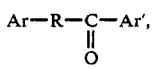

wherein Ar and Ar' are aromatic group, possibly substituted with alkyl groups containing up to 15 carbon atoms, and wherein R and R' are aliphatic or cycloaliphatic chains containing from 1 to 15 carbon atoms. Examples of ketones comprised by formulae (IV) to (VII) are:

Acetophenone, phenylbutylketone, methyl-α-naphtylketone, benzyl-phenylketone.

Furthermore, as ketones, as herein above defined, there may be used ketones containing one or more functional groups that are substantially non-reactive with the maleic anhydride under reaction conditions, such as the etheric, esteric, thioetheric, aminic and amidic groups containing tertiary nitrogen atoms, aldehydic or halogen atoms.

There may be used also mixtures of such ketones with eachother, possibly in admixture with minor quantities of solvents or suspending agents different from the above said ketones, provided said mixtures as well as the single above described ketones, shall not lead to a perceivable dissolving of the polymer under reaction conditions.

Examples of solvents or suspendants that may be use with the ketones, are the aliphatic, cycloaliphatic, or aromatic hydrocarbons, possibly halogenized.

The boiling point of the suspendant is not a critical characteristic of the process, although high-boiling ketones are preferred when one wishes to operate at atmospheric pressure and with radical starters, whose reactivity be sufficiently high only at high temperatures.

For instance, since the grafting of maleic anhydride on an EMP copolymer, in the presence of dibenzoyl-peroxide, may be carried out at sufficient reaction rate only at a temperature of around at least 80° C., the suspendant shall have a boiling point of at least 80° C. in order to operate at atmospheric pressure, otherwise one will have to operate at much higher pressures.

At the end of the grafting reaction, the polymer is separated from the suspendant according to the methods of the Prior Art (filtering, centrifuging). The suspendant, containing unreacted maleic anhydride, may be directly re-employed as a suspendant for a subsequent grafting reaction. The grafted polymer, after a possible washing with fresh ketone, is subjected to drying.

The use of low-boiling ketones is particularly useful in as much as the final drying operation on the drafted polymer turns out to be particularly facilitated.

In this case the starter must have high decomposition speeds even at low temperatures, said high decomposition speed possibly being favoured by accelerators; with other types of starters, on the contrary, it will be necessary to operate at temperatures greater than 80° C., under pressure.

Operating according to the process herein above described, it is also possibly to graft onto the polymer other unsaturated monomers together with maleic anhydride.

Particularly convenient turns out to be the grafting on the olefinic polymers of maleic anhydride together with the styrene. In this case, in fact, in the suspendant, besides these monomer, there is also soluble the possible copolymer styrene/maleic anhydride that may be formed parallely with the grafting reaction. Consequentily, during the successive phase of the separation of the suspendant, also these by-products are removed from the grafted polymer.

The quantity of styrene, that may be used in admixture with the maleic anhydride in the grafting process, may vary considerably; thus, the styrene may be used in a quantity of up to 70% by weight, with a preferred minimum of 20% by weight, on the mixture with the anhydride.

Thus, object of the present invention is that of providing a process for the grafting of maleic anhydride, either alone or together with styrene, on olefinic polymers, said process consisting in the reacting of maleic anhydride, possibly in admixture with styrene and in the presence of a radicalic starter (initiator), with such polymers maintained in the state of suspension in a liquid suspending agent consisting of, or prevailingly comprising an aliphatic, cycloaliphatic, or aromatic ketone containing from 3 to 22 carbon atoms.

The olefinic polymers that may be used for the purposes of the present invention, comprise the homopolymers of monomers of the general formula:

$$R-CH=CH_2$$

(wherein R=hydrogen or an alkyl radical containing from 1 to 6 carbon atoms) as well as the copolymers obtained by the copolymerization of the mixture of said monomers.

Examples of homopolymers are: polyethylene, polypropylene, polybutene, poly-4-pentene, polyhexene, polyoctene.

Examples of copolyers are represented by the ethylene/propylene copolymers (EPM), possibly comprising minor quantities of a third monomer consisting of a diene, either conjugated or not conjugated (terpolymers EPDM), and furthermore by copolymers of ethylene with butene-1, hexene-1, octene-1, 4-methylpentene-1, or terpolymers ethylene/propylene/hexen-1, and moreover, said co- or ter-polymers possibly containing double bonds coming from the conjugated or unconjugated dienes used in the course of the polymerization.

The respective quantities of monomers in said copolymers are not critical; they may vary within a very wide range without any prejudice to the possibility of use of the copolymers themselves in the process of this invention.

Thus, for instance, the elastomeric copolymers EPM and EPDM, which may be used for the purposes of the present invention, in general consist in from 30% to 80% by weight of ethylene and from 0% to 15% by weight of a termonomer consisting of a conjugated or unconjugated diene.

Examples of such dienes are: ethyldienenorbornen, 1.4-hexadiene, dicyclopentadiene, butadiene.

The suspension of the polymers is prepared by adding to the suspending liquid the polymer in a subdivided (particled form) with a mean particle diameter of from 0.1 to 10 mm, but preferably comprised between 0.3 and 3 mm.

The quantity of maleic anhydride used in the reaction may be comprised between 0.1% and 100% by weight with respect to the polymer, but preferably may be comprised between 3% and 60% by weight.

In general the concentrations of polymer to be grafted in the suspendant, vary from 20 to 600 g/lt, but preferably vary from 100 to 400 g/lt.

The quantity of starter to be fed to the reaction varies from 0.01% to 10% by weight, but preferably should be comprised between 0.3% and 3% by weight with respect to the polymer.

In the case in which the reaction be conducted in a discontinuous way, the starter may be fed either wholly in one single batch or in a plurality of batches or, preferably, in a continuous way during the whole course of the reaction. This would allow the control on the concentration of the free radicals and, more particularly, to maintain said concentration almost constant, especially so in the case there are used peroxides with a high decomposition rate.

The reaction temperature may vary from 20° C. to 250° C., but preferably may be comprised between 80° C. and 160° C. At any rate the reaction temperature shall be chosen on the basis of the type of radicalic starter and of the suspendants used.

The polymers grafted with maleic anhydride or with maleic anhydride and styrene, prepared according to the process object of the present invention, display good characteristics of adhesion to metals, at least equal to that of analogous polymers that have been grafted with the same monomers but following conventional processes.

Moreover, these products grafted according to the procedures of the present invention, are particularly suited, following a suitable mixing together with polar polymers such as polyamides and saturated polyesters, for the preparation of polymeric compounds (compositions) endowed with high mechanical characteristics and a high shock or impact resistance.

Such polymeric compositions are prepared by mixing together in an extruder or in an internal mixer, the polar polymer and the grafted product, in particular a grafted EPM or EPDM rubber, at the melting temperature of the polar polymer. The following examples are given to illustrate the present invention.

On the grafted polymers there have been carried out measurements of the content in grafted monomer (determined by means of acidimetry), of the degree of cross-linkage (as % by weight of polymer insoluble in xylol at 23° C.) and of the adhesion to metals, according to the method illustrated hereunder.

MEASUREMENT OF THE ADHESION TO METALS 1 gram of the grafted polymer under examination was placed into a plate press between two 20×20 cm sized aluminum foils (preliminarily cleaned and degreased with heptane) at 200° C. for 10 minutes, under a pressure of 200 Kg/sq.cm.

The sandwich thus obtained was cut up into 25 mm wide strips and on the single strip, by means of an IN-STROM instrument, there was determined the resistance (PEEL STREGTH expressed in Kg/cm) to the breakaway or frilling of one of the two aluminum foils from the polymer under examination, operating at a temperature of 23° C. and at a frilling speed or rate of 10mm/minute.

EXAMPLE 1-10

Into a three-necked glass flask, fitted with a breakwater, or a bubbling cooler and a stirrer, there were introduced: the polymer to be grafted and the suspendant in a ratio of 300 g of polymer to 1 liter of liquid.

This mixture was then heated up under stirring until reaching the desired temperature and, under a nitrogen atmosphere, there were then introduced the monomers to be grafted and, successively, the peroxide.

At the end of the test, the suspension was cooled down to room temperature, the grafted polymer was separated by filtering on a metal net and then washed with acetone at 50° C. three times.

After drying at 70° C., under vacuum, for 5 hrs., the polymer was analyzed and evaluated as previously indicated. The data concerning the other operational procedures and the characteristics of the products obtained have been recorded on the tables at the following pages.

In the given examples the following polymers had been grafted:
A: ethylene/propylene copolymer containing 29% by weight of propylene, endowed with a Mooney ML 1+4 viscosity at 100° C. equal to 36.
B: ethylene/propylene copolymer containing 43% by weight of propylene, and having a Mooney ML 1+4 viscosity at 100° C. equal to 40.
C: ethylene/propylene copolymer containing 28% by weight of propylene, and having a Mooney ML 1+4 viscosity at 121° C. equal to 65.
D: ethylene/propylene/ethylidenenorbornene terpolymer containing 28% by weight of propylene and 4.4% by weight of ethylidenenorbornene, and having a Mooney MI, 1+4 viscosity at 121° C. of 65.

TABLE

| EXAMPLES | 1 | 2 | 3 | 4 | 5 |
|---|---|---|---|---|---|
| SUSPENDANT | METHYL-ETHYL KETONE | METHYL-ETHYL KETONE | METHYL-ISOBU-TYLKETONE | METHYL-ISOBU-TYLKETONE | METHYL-ISOBU-TYLKETONE |
| Type of polymer to graft | A | A | A | A | A |
| Maleic Anhydride Polymer weight ratio | 0.5 | 0.25 | 0.5 | 0.5 | 0.25 |
| Maleic Anhydride Styrene weight ratio | — | 1.5 | — | — | 1.5 |
| Peroxide | DIBENZOYL PEROXIDE | DIBENZOYL PEROXIDE | DIBENZOYL PEROXIDE | DIBENZOYL PEROXIDE | DIBENZOYL PEROXIDE |
| PEROXIDE POLYMER weight ratio | 0.02 | 0.01 | 0.005 | 0.03 | 0.005 |
| TEMPERATURE (°C.) | 80 | 80 | 100 | 100 | 100 |
| DURATION (hrs) | 2 | 2 | 2 | 2 | 2 |
| Grafted MALEIC ANHYDRIDE (% b.w.) | 0.51 | 2.3 | 0.68 | 1.9 | 3.6 |
| Grafted Styrene (% b.w.) | — | 2.2 | — | — | 8.5 |
| Polymer unsoluble in xylol at 23° C. (% b.w.) | 15 | 3 | 3 | 5 | 15 |
| Peel strength on aluminum (Kg/cm) | 4.2 | 3.8 | 4 | 4 | 4.4 |
| Peel strength on aluminum of the not grafted polymer | 2.5 | 2.5 | 2.5 | 2.5 | 2.5 |
| EXAMPLES | 6 | 7 | 8 | 9 | 10 |
| SUSPENDANT | METHYL-ETHYL KETONE | Methylisobutyl ketone | Methylisobutyl ketone | Methylisobutyl ketone | Methylisobutyl ketone |
| Type of polymer to graft | A | B | C | C | C |
| Maleic Anhydride Polymer weight ratio | 0.25 | 0.25 | 0.5 | 0.25 | 0.5 |
| Maleic Anhydride Styrene weight ratio | 1.8 | 1.5 | — | 1.5 | — |
| Peroxide | DIBENZOYL PEROXIDE | DIBENZOYL PEROXIDE | DIBENZOYL PEROXIDE | DIBENZOYL PEROXIDE | DIBENZOYL PEROXIDE |
| PEROXIDE | | | | | |

TABLE-continued

| | | | | | |
|---|---|---|---|---|---|
| POLYMER weight ratio | 0.02 | 0.02 | 0.03 | 0.02 | 0.0025 |
| TEMPERATURE (°C.) | 50 | 100 | 100 | 100 | 100 |
| DURATION (hrs) | 2 | 2.5 | 4 | 2 | 2.5 |
| Grafted MALEIC ANHYDRIDE (% b.w.) | 0.42 | 6 | 1.9 | 4.2 | 0.98 |
| Grafted Styrene (% b.w.) | — | 18 | 10 | 10 | 10 |
| Polymer unsoluble in xylol at 23° C. (% b.w.) | 5 | 1.4 | 9 | 10 | 10 |
| Peel strength on aluminum (Kg/cm) | 3.2 | 1.4 | 9 | 10 | 8 |
| Peel strength on aluminum of the not grafted polymer | 2.5 | 0.5 | 0.1 | 0.1 | 0.1 |

EXAMPLE 11

The grafting of maleic anhydride and styrene was carried out on polymer A as previously herein above defined, operating under the same conditions as those specified in example 5, but with a peroxide/polymer ratio by weight equal to 0.02 instead of 0.005.

The degree of total grafting proved to be equal to 11.5% by weight.

The suspending liquid (separated by filtering), preserved under a nitrogen atmosphere, was then used for a successive grafting test.

For this purpose, a new quantity of polymer was suspended in the recycling liquid in a concentration of 300 g/lt; the resulting suspension was thereupon heated up to 100° C. in a nitrogen atmosphere, and kept under stirring for 2.5 hours, after addition of dibenzoylperoxide (ratio by weight peroxide/polymer=0.025).

On the filtered, washed and dried polymer, the total degree of grafting proved to be 2.1% by weight.

EXAMPLE 12

It was proceeded as in example 11, except for the addition to the recycled suspendant, in the grafting phase, of additional quantities of maleic anhydride (weight ratio with the polymer=0.038), of styrene (weight ratio with the polymer equal to 0.1) and of dibenzoylperoxide (weight ratio with the polymer=0.02).

The degree of total grafting proved to be equal to 7% by weight.

EXAMPLE 13

A mixture consisting of 75 parts by weight of Nylon 6 (Sniamid ASN 275 of SNIA S.p.A.), pre-dried for 12 hours at 100° C. under vacuum, and of 25 parts by weight of the product grafted according to the procedures of example 7, dried and stabilized with 0.5% of PLASTONOX 425, was granulated in a double-screw Werner extruder, under the following operational conditions:

| | |
|---|---|
| Temperature of the molten product | 240° C. |
| Revolving speed of screws | 150 rpm |
| Pressure (degassing) | 350 torr. |

The granulate, dried at 100° C. for 12 hours under vacuum, was injection formed into small bars sized 125×12×6 mm. On these bars an indent at 45° C., 0.5 mm deep was made.

The mechanical characteristics of the mixture, determined on the bars, after their curing at the desired temperature were the following:

| TEMPERATURE (°C.) | IMPACT RESISTANCE (IZOD Test, ASTM-D 256) (J/m) | ELASTICITY MODULUS (ASTM D 790) (MPa) |
|---|---|---|
| 23 | 810 + 16 (partial breakage) | 1608 |
| −30 | 177 + 10 (complete breakage) | — |

What is claimed is:

1. Process for grafting maleic anhydride, alone or together with styrene, onto copolymers of ethylene with alpha-olefins of the formula, R—CH=CH$_2$, wherein R=C$_1$-C$_6$ alkyl, which comprises reacting said copolymers with an amount of maleic anhydride between 3 and 60% by weight with respect to the copolymer, in the presence of radical starters, at temperatures between 20° C. and 250° C., in a liquid medium consisting at least prevailingly of an aliphatic, cycloaliphatic or aromatic ketone containing from 3 to 22 carbon atoms, said copolymer being maintained in a state of suspension.

2. Process according to claim 1, characterized in that the grafting reaction occurs at temperatures comprised between 80° C. and 160° C.

3. A process as clailmed in claim 1, wherein the maleic anhydride/styrene weight ratios are between 1.5 and 1.8 when styrene is present in the reaction mixture.

4. The process according to claim 1, wherein the ethylene copolymer has a minor amount of units derived from a diene monomer.

5. Process for grafting maleic anhydride, alone or together with styrene, on copolymers of ethylene with alpha-olefins of the formula R—CH=CH2, wherein R=C$_1$-C$_6$ alkyl, and containing minor amounts of units derived from a diene monomer, by means of radical starters, characterized in that the reaction is carried out at 20°-250° C. by maintaining the polymer in suspension in a liquid medium consisting prevailingly of an aliphatic, cycloaliphatic or aromatic ketone containing from 3 to 22 carbon atoms.

6. Process according to claim 5, characterized in that the grafting reaction occurs at temperatures comprised between 80° C. and 160° C.

7. The process according to claim 1, wherein the maleic anhydride is mixed with an amount of styrene up to 70% by weight with respect to the sum of its weight plus that of the maleic anhydride.

* * * * *